United States Patent [19]
Johnson

[11] Patent Number: 5,437,427
[45] Date of Patent: Aug. 1, 1995

[54] BINOCULAR MOUNTING ASSEMBLY FOR ASTRONOMICAL OBSERVATIONS

[76] Inventor: Peter D. Johnson, 2451 Nott St., Niskayuna, N.Y. 12309

[21] Appl. No.: 186,284

[22] Filed: Jan. 25, 1994

[51] Int. Cl.⁶ ............................................. E04G 3/00
[52] U.S. Cl. .................................. 248/286; 359/430; 248/292.1
[58] Field of Search .................... 248/292.1, 291, 298, 248/284, 286, 287, 123.1; 359/430

[56] References Cited
U.S. PATENT DOCUMENTS

| | | | |
|---|---|---|---|
| 617,108 | 1/1899 | Lundin | 359/430 |
| 2,423,282 | 7/1947 | Aubey | 248/183 |
| 2,776,102 | 1/1957 | Schlafly | 248/178 |
| 3,133,719 | 5/1964 | Beck | 248/187 |
| 3,840,284 | 10/1974 | Rand | 359/430 |
| 4,702,450 | 10/1987 | Barisa | 248/292.1 |
| 4,849,778 | 7/1989 | Samuelson | 248/292.1 X |
| 5,173,802 | 12/1992 | Heller | 359/392 X |
| 5,221,991 | 6/1993 | Webster | 248/187 X |

OTHER PUBLICATIONS

"In Search of a Good Binocular Mount", Sky & Telescope, Jun. 93, pp. 35–40.

*Primary Examiner*—Ramon O. Ramirez
*Attorney, Agent, or Firm*—Schmeiser, Olsen & Watts

[57] ABSTRACT

A compact, substantially vibration-free binocular mounting assembly for supporting large binoculars during astronomical observations. The binocular mounting assembly is adapted to be rotated about a horizontal axis during altitude adjustment, with the binocular eyepieces closely following the eye position of a seated astronomical observer as the altitude of observation is varied from horizon to zenith.

10 Claims, 1 Drawing Sheet

BINOCULAR MOUNTING ASSEMBLY FOR ASTRONOMICAL OBSERVATIONS

FIELD OF THE INVENTION

The present invention relates to a binocular mounting assembly for supporting large binoculars during astronomical observations and, more particularly, to a compact, substantially vibration-free binocular mounting assembly which is adapted to be rotated about a horizontal axis during altitude adjustment, with the eyepieces of the binoculars closely following the eye position of the astronomical observer as the altitude of observation is varied. Advantageously, the binocular mounting assembly of the present invention is designed to be utilized with the astronomical observer in a comfortable, seated position as the viewing direction is arcuately rotated from horizon to zenith.

BACKGROUND OF THE INVENTION

As well known in the art, it is generally not possible to make satisfactory hand held astronomical observations using binoculars having magnifications greater than ten times (10X) and objective diameters greater than 50 mm (10X50), unless a mechanical support is provided to reduce or eliminate hand vibrations. Heretofore, many complex mechanical mounting systems have been developed to eliminate the deleterious vibrations commonly associated with astronomical observations performed with high power binoculars. Typically, such systems are intended to be utilized with the observer in a standing position, thereby making observations near the zenith uncomfortable or impossible. Further, currently available binocular mounts are generally supported on a tripod structure, with the center of gravity of the binocular and/or counterweights at a relatively large distance from the head of the tripod. As such, exceptionally sturdy tripods are oftentimes necessary to minimize unwanted vibrations. Unfortunately, the resulting massive and awkward structures have limited portability, decrease the convenience of astronomical observations, and do not satisfactorily eliminate vibrations.

SUMMARY OF THE INVENTION

In order to avoid the disadvantages of the prior art, the present invention provides a simple, compact and substantially vibration-free binocular mounting assembly for binoculars and other optical systems utilized during astronomical observations. Advantageously, the mounting assembly provides the altitude adjustments required during such observations. Preferably, the mounting assembly is removably attached to a conventional pan-head camera tripod to provide azimuth adjustment.

The binocular mounting assembly of the present invention incorporates a counterweight to balance the assembly at the point of attachment to the supporting tripod, and to counterbalance the attached binoculars to prevent unintended rotation about the altitude axis. As such, the tripod is exclusively exposed to the downwardly directed vertical force of the binocular mounting assembly. This force is generally limited to approximately twenty pounds for large binoculars, thereby allowing the present invention to be secured to the lightweight, inexpensive tripods typically utilized to support cameras and the like. The most suitable tripods are of the type having a vertically adjustable center post, wherein the binocular mounting assembly may be optimally positioned in accordance with the seated height of an observer.

Although the binocular mounting assembly is particularly useful for larger binoculars having a magnification (power) greater than ten times (10X), an objective lens diameter of between 50–100 mm, and a weight of less than about eight pounds, it may be utilized with smaller, less powerful binoculars. Further, the binocular mounting assembly may be utilized to mount small compact refracting or compound telescopes for astronomical observations. Such telescopes typically have objective lens diameters ranging from 40–80 mm and magnifications ranging from 15–100X. Finally, it should be readily apparent to those skilled in the art that the basic design disclosed herein may be applied to larger binoculars, having objective lens diameters of greater than 100 mm, by providing two complementary mounting assemblies, each adapted to support opposing binocular sections. In this case, azimuth adjustment may be achieved by attaching the complementary mounting assemblies to a rotating platform on which the observer is seated.

BRIEF DESCRIPTION OF THE DRAWINGS

These and other features of the present invention will become readily apparent upon reading the following detailed description and upon reference to the drawings in which.

DETAILED DESCRIPTION OF THE INVENTION

Figure 1:
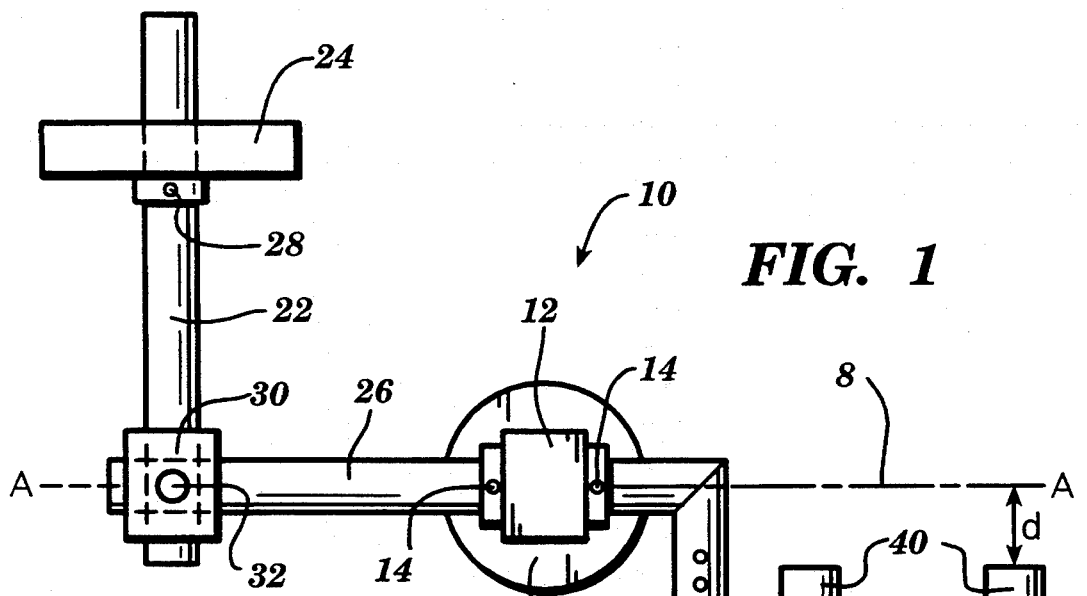
FIG. 1 is a top view of a binocular mounting assembly in accordance with a preferred embodiment of the present invention.

Referring now specifically to the drawings, there is illustrated a binocular mounting assembly, generally designated as 10, in accordance with a preferred embodiment of the present invention, wherein like reference numerals refer to like elements throughout the drawings.

Figure 3:
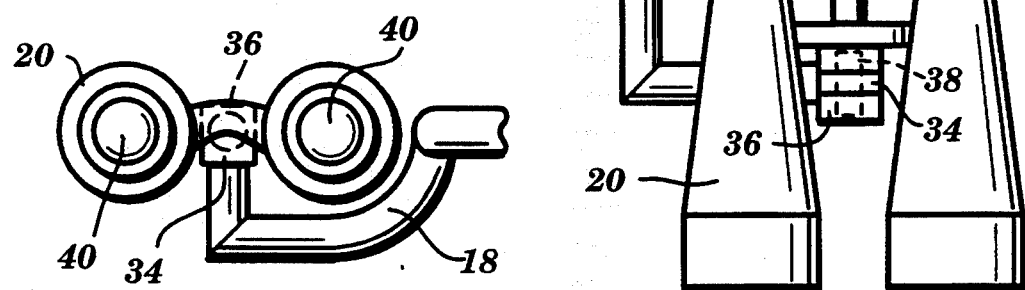
FIG. 3 is an end view of the binocular mounting assembly of FIG. 1.
Figure 2:
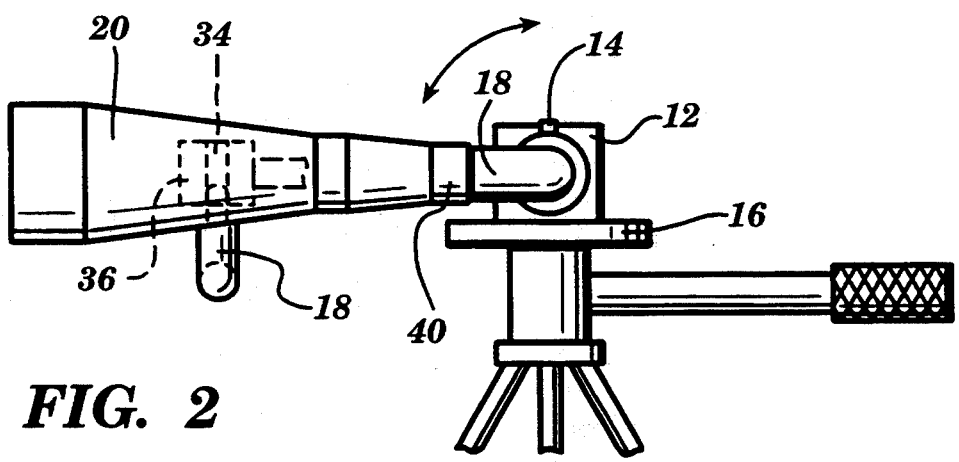
FIG. 2 is a side view of the binocular mounting assembly of, FIG. 1.

As illustrated in FIGS. 1–3, the binocular mounting assembly 10 is manually rotatable within an altitude bearing 12 about an altitude axis A. Rotation of the binocular mounting assembly within the altitude bearing is controlled via set screws 14. The binocular mounting assembly 10 is secured to a pan-head tripod 16 by screwing a tripod attachment screw into a matched threaded hole (not shown) in the bottom of the altitude bearing 12. The binocular mounting assembly 10 includes a telescopically adjustable binocular support arm 18 for supporting binoculars 20, a counterweight support arm 22 for supporting a movable counterweight 24, and a rotatable, horizontally displaceable shaft 26 for coupling the binocular support arm 18 and counterweight support arm 22 through the altitude bearing 12. The movable counterweight 24 is slidably engaged about the counterweight support arm 22 and includes a set screw 28 or the like to secure the counterweight in a suitable position along the counterweight support arm. A fastening member 30 is provided to attach the counterweight support arm 22 to the rotatable, horizontally displaceable shaft 26. A set screw 32 is utilized to removably secure the arrangement comprising the counterweight support arm 22 and fastening member 30 to a distal end section of the rotatable, horizontally displaceable shaft 26. During the assembly of the present invention, the counterweight support arm 22 is secured to the distal end section of the shaft 26 after the shaft has been inserted through the altitude bearing 12. The fastening member 30 may be movably secured along the length of the shaft 26 during the balancing of the binocular mounting assembly.

The binoculars 20 are removably secured to an apertured end section 34 of the adjustable binocular support arm 18 with bolt 36. The bolt 36 is adapted to be secured within a standard ¼-20 threaded mounting hole 38 which is disposed on a front, center post of the binoculars 20.

To eliminate unwanted rotational torque along the altitude axis A, the mass of the binoculars 20 is balanced by the counterweight 24 which is movably positionable along the counterweight support arm 22. More specifically, the product of the mass of the counterweight 24 and the distance from the counterweight to the altitude axis A must be equal to the product of the mass of the binoculars 20 and the distance from the center of gravity of the binoculars to the altitude axis A. The altitude axis A and the centers of gravity of the binoculars 20 and the counterweight 24 must all lie in the same plane to assure balance at all viewing angles. Depending upon the mass of the binoculars 20, the counterweight 24 may be suitably positioned along the counterweight support arm 22 and secured in position using set screw 28.

Stress on the pan-head tripod 16 is minimized by balancing the binocular mounting assembly 10 at the point of attachment to the tripod. One requirement for correct balance is the above-described rotational balance about the altitude axis A. Complete balance of the binocular mounting assembly 10 is further accomplished by balancing the forces which tend to tilt the altitude axis. To achieve this balance, the product of the mass of the counterweight 24 and the distance from the fastening member 30 to the tripod mounting screw must be equal to the product of the mass of the binoculars 20 and the distance from the tripod mounting screw to the point B on the altitude axis A closest to the center of gravity of the binoculars.

In order to provide continual positioning of the binocular eyepieces 40 in front of the eyes of a seated observer as the shaft 26 is rotated about the altitude axis A and the altitude of observation is varied, the eyepieces 40 are offset a distance d from the altitude axis A. I have found that an offset of approximately two inches provides a good matching of eyepiece and eye position. To accommodate differences in the physiological structure of different observers, the offset may be altered by changing the overall length of the telescopically adjustable binocular support arm 18, preferably in the range of one to at least four inches.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, the shaft 26 may be length adjustable to vary the distance of the binoculars 20 from the tripod 16. Such modifications and variations that may be apparent to a person skilled in the art are intended to be included within the scope of this invention as defined by the accompanying claims.

I claim:

1. An altitude adjustable mounting assembly for optical observing devices comprising:
    a rotatable shaft;
    a bearing for receiving said rotatable shaft therethrough, said shaft being rotatable about a horizontal axis;
    a counterweight;
    a first securing member for mounting said counterweight to a first end section of said rotatable shaft, said first securing member extending rearwardly from said horizontal axis of said rotatable shaft;
    a second securing member for mounting an optical observing device to a second, opposing end section of said rotatable shaft, said second securing member extending forwardly from the horizontal axis of said rotatable shaft, said first and second securing members extending in substantially opposite directions; and
    a coupling arrangement for attaching said bearing to a supporting structure;
    wherein said optical observing device is arcuately rotatable upon a rotation of said shaft within said bearing; and
    wherein said second securing member is length adjustable.

2. The altitude adjustable mounting assembly according to claim 1 wherein said counterweight is longitudinally displaceable along said first securing member.

3. The altitude adjustable mounting assembly according to claim 1 wherein said optical observing device is a binocular.

4. The altitude adjustable mounting assembly according to claim 1 wherein said bearing further includes a rotation limiting arrangement, said rotation limiting arrangement controlling the arcuate rotation of said optical observing device.

5. The altitude adjustable mounting assembly according to claim 1 wherein said optical observing device includes at least one rearwardly facing eyepiece, and wherein said second securing member is adapted to forwardly offset said eyepiece from the horizontal axis of said rotatable shaft, said offset remaining constant during an arcuate rotation of said rotatable shaft.

6. The altitude adjustable mounting assembly according to claim 1 wherein said optical observing device is adapted to be utilized with an observer in a seated position.

7. The altitude adjustable mounting assembly according to claim 1 wherein said optical observing device includes at least one rearwardly facing eyepiece and wherein said second securing member is adapted to forwardly offset said eyepiece from the axis of said rotatable shaft, said offset remaining constant during rotation of said rotatable shaft.

8. The altitude adjustable mounting assembly according to claim 7 wherein said second securing member is adjustable to provide arcuate rotation of said eyepiece at said offset at a radius of 1 to 4 inches.

9. The altitude adjustable mounting assembly for optical observing devices comprising:
    a rotatable shaft;
    a bearing for receiving said rotatable shaft therethrough, said shaft being rotatable about a horizontal axis;
    a counterweight;

a first securing member for mounting said counterweight to a first end section of said rotatable shaft, said first securing member extending rearwardly from said horizontal axis of said rotatable shaft;

a second securing member for mounting an optical observing device to a second, opposing end section of said rotatable shaft, said second securing member extending forwardly from the horizontal axis of said rotatable shaft, said first and second securing members extending in substantially opposite directions; and a coupling arrangement for attaching said bearing to a supporting structure;

wherein said optical observing device is arcuately rotatable upon a rotation of said shaft within said bearing; and wherein said first securing member is longitudinally displaceable along said rotatable shaft.

10. The altitude adjustable mounting assembly according to claim 9 wherein said first securing member is lengthwise displaceable along said rotatable shaft.

* * * * *